US008635050B2

(12) United States Patent
Aikawa

(10) Patent No.: US 8,635,050 B2
(45) Date of Patent: Jan. 21, 2014

(54) METHOD FOR FINDING THE FILLING RATE OR THE POROSITY OF POWDER

(76) Inventor: Yutaka Aikawa, Takasaki (JP)

( * ) Notice: Subject to any disclaimer, the term of this patent is extended or adjusted under 35 U.S.C. 154(b) by 201 days.

(21) Appl. No.: 13/192,847

(22) Filed: Jul. 28, 2011

(65) Prior Publication Data

US 2013/0013271 A1    Jan. 10, 2013

(30) Foreign Application Priority Data

Jul. 9, 2011 (JP) .................. 2011-152398

(51) Int. Cl.
 *G06F 7/60* (2006.01)
(52) U.S. Cl.
 USPC ...................... 703/2; 703/4; 703/5
(58) Field of Classification Search
 USPC .................. 703/2, 10; 423/518, 544; 252/71
 See application file for complete search history.

(56) References Cited

U.S. PATENT DOCUMENTS

| | | | | |
|---|---|---|---|---|
| 7,386,368 | B2* | 6/2008 | Andersen et al. | 700/265 |
| 7,678,360 | B2* | 3/2010 | Okada et al. | 423/544 |
| 2009/0158970 | A1* | 6/2009 | Andersen et al. | 106/817 |
| 2012/0032107 | A1* | 2/2012 | Imbabi et al. | 252/71 |

OTHER PUBLICATIONS

Amirjanov et al., "Optimization of a Computer Simulation Model for Packing of Concrete Aggregates", Particulate Science and Technology, 2008, pp. 1-12.*
Chen et al., " Computer simulation model for spherical particle filled composite materials" Key Engineering vols. 474-476, 2011,pp. 7-10.*
Keren et al. , "Highly filled particulate thermoplastic composites", Journal of Materials Science ,1999, pp. 693-699.*

Jia et al.,"A packing algorithm for particles of arbitrary shapes", Elsevier Science B.V.,2001, pp. 175-186.*

* cited by examiner

*Primary Examiner* — Shambhavi Patel
*Assistant Examiner* — Iftekhar Khan
(74) *Attorney, Agent, or Firm* — Oblon, Spivak, McClelland, Maier & Neustadt, L.L.P.

(57) ABSTRACT

The size distribution f(r) of powder particles is found, and the packing rate p of the powder particles is found based on the size distribution f(r) according to the following formula (a):

$$p = \sum_i \sum_j \frac{r_i^2 r_j^3 f(r_i) f(r_j)}{\langle r^2 \rangle \langle r^3 \rangle} p_{ji}(\max) \quad (a)$$

where
 $f(r_i)$: a frequency of i-particles having a radius of $r_i$ contained in the powder particles,
 $f(r_j)$: a frequency of j-particles having a radius of $r_j$ contained in the powder particles,
 $r_i$: the radius of the i-particles contained in the powder particles,
 $r_j$: the radius of the j-particles contained in the powder particles, $$\langle r^2 \rangle : \sum_i r_i^2 f(r_i)$$

$$\langle r^3 \rangle : \sum_i r_i^3 f(r_i)$$

$p_{ji}(\max)$: a void fraction in a hypothetical sphere having a radius of $r_j + r_i$ around a j-particle having a radius of $r_j$ when the j-particle has i-particles most closely packed therearound so as be brought into contact therewith.

13 Claims, 3 Drawing Sheets

METHOD FOR FINDING THE FILLING RATE OR THE POROSITY OF POWDER

FIELD OF THE INVENTION

The present invention relates to a method for finding the packing rate or the void fraction of powder, in particular a method for precisely finding the packing rate or the void fraction of a powder mixture, such as cement.

DISCUSSION OF BACKGROUND

In the process for producing cement by mixing several kinds of material powder particles as raw materials for the cement, followed by adding water to the mixture, it has been known that the mixing state and the void fraction of the mixed material powder particles govern the density or the strength of the cement which has gelled. Specifically, it has been experimentally revealed that the strength of cement decreases as the void fraction of the cement increases, in other words, the strength of cement increases as the packing rate of the cement increases. In order to determine in what mixing proportion the material powder particles of cement should be mixed for the purpose of increasing the strength of the cement, or in what mixing proportion the material powder particles of cement should be mixed for the purpose of obtaining a desired strength, it is essential as the element technology to control the packing rate of mixed material powder particles in production.

Since the control of the mixing proportion of raw materials (material powder particles) for controlling the packing rate of powder has depended on empirical rules and intuition in the actual process, there are no measures to determine whether the selected mixing proportion is actually optimum or not. Furthermore, although raw materials change on a daily basis since waste materials are employed as raw materials for cement for the purpose of securing resources, it is necessary to employ such waste materials and constantly secure a cement property that gives a certain required strength. In order to obtain such a certain property, it is primarily important to control the packing rate of powder by selecting the proportion of raw material powder particles. In order to control the proportion of raw material powder particles so as to bring the packing rate within a certain range, the packing rate has been estimated by a skilled person's intuition based on his or her empirical rules, and thus, the cement has been produced so as to meet a certain level to some degree.

SUMMARY OF THE INVENTION

Technical Problem

As described above, the estimation of the packing rate of mixed raw material powder particles for cement has been performed in accordance with a manual prepared based on accumulated data of empirical rules, finally depending on a skilled person's intuition. However, if the properties of the raw materials change, the empirical rules that meet specific raw materials are not applicable since the properties of different raw materials (such as size distribution and particle sizes) govern the packing rate in a strict sense. From this point of view, it is necessary to find empirical rules that are appropriate for new raw materials. In order to obtain such empirical rules for all of possible raw materials, it is necessary to conduct a vast number of experiments, which is actually impossible. In order to cope with new raw materials, there is no other way but to make estimation, depending on a skilled person's experiences and intuition based on the existing data on similar raw materials. However, there is a limit to this type of measures in terms of scientific accuracy. It is extremely difficult to accurately secure a certain packing rate while raw materials, which are actually different on a daily basis, are employed.

It is an object of the present invention to provide a method for accurately and simply finding the packing rate or the void fraction of powder, such as cement.

Solution to Problem

The present invention, which solves the above-mentioned problem, is characterized as follows:

(1) A method for finding a packing rate of powder particles, comprising finding a size distribution f(r) of the powder particles, and finding a packing rate p of the powder particles based on the size distribution f(r) according to the following formula (a):

$$p = \sum_i \sum_j \frac{r_i^2 r_j^3 f(r_i) f(r_j)}{\langle r^2 \rangle \langle r^3 \rangle} p_{ji}(\max) \tag{a}$$

Where
 $f(r_i)$: a frequency of i-particles having a radius of $r_i$ contained in the powder particles,
 $f(r_j)$: a frequency of j-particles having a radius of $r_j$ contained in the powder particles,
 $r_i$: the radius of the i-particles contained in the powder particles,
 $r_j$: the radius of the j-particles contained in the powder particles, $$\langle r^2 \rangle : \sum_i r_i^2 f(r_i)$$

$$\langle r^3 \rangle : \sum_i r_i^3 f(r_i)$$

$p_{ji}(\max)$: a void fraction in a hypothetical sphere having a radius of $r_j + r_i$ around a j-particle having a radius of $r_j$ when the j-particle has i-particles most closely packed therearound so as to be brought into contact therewith.

(2) A method for finding a packing rate p of mixed powder particles, comprising finding the packing rate p of the mixed powder particles according to formula (a) based on a frequency $F(r_i)$ of the mixed powder particles given by the following formula (b) with respect to the mixed powder particles formed by mixing at least two kinds of powder particles having size distributions of $f_1(r), f_2(r), \ldots$ at volume proportions of $V_1:V_2:\ldots$ $$F(r_i) = \frac{\sum_j \frac{p_j V_j f_j(r_i)}{\sum_k r_k^3 f_j(r_k)}}{\sum_j \frac{p_j V_j}{\sum_k r_k^3 f_j(r_k)}} \tag{b}$$

where
 $p_j$: a packing rate of powder particles having a size distribution $f_j(r)$,
 $V_j$: a volume of the powder particles having the size distribution $f_j(r)$, $f_j(r_i)$: a frequency of i-particles having a radius of $r_i$ contained in the powder particles having the size distribution $f_j(r)$, $r_k$: a radius of k-particles contained in the powder particles, $f_j(r_k)$: a frequency of the k-particles having a radius of $r_k$ contained in the powder particles having the size distribution $f_j(r)$.

(3) The method for finding a void fraction of powder particles, comprising finding a void fraction δ of the powder particles according to the following formula (c) based on the packing rate p of the powder particles found according to the method defined in item (1) or (2).

$$\delta = 1 - p \tag{c}$$

(4) The method for finding the packing rate or the void fraction of the powder particles according to any one of items (1) to (3), wherein the powder particles are cement.

Advantageous Effect(s) of Invention

In accordance with the present invention, it is possible to accurately and simply find the packing rate or the void fraction of powder, in particular the packing rate or the void fraction of powder with at least two kinds of raw material powder particles mixed therein, such as cement.

DETAILED DESCRIPTION OF THE PREFERRED EMBODIMENTS

It is possible to formulate a basic theory for the packing rate of powder having a size distribution by introducing a statistical method. Thus, it becomes to calculate the packing rate of a particle system in accordance with a size distribution function. In accordance with such a theory, it also becomes possible to calculate the packing rate of a mixed system where particle systems having different size distributions mixed therein.

In order to analyze the packing state of powder, many basic theories or calculations have been proposed in the basic field of a system having sphere packing. As one of the fundamental issue, the random packing density of spheres having an equal radius has been calculated by computer simulation.

The inventor has invented the following method in order to theoretically find the packing rate of a system having a size distribution.

In general, the calculation of powder density involves difficult problems caused by particle shapes, interactions among particles, and so on. Although many attempts have been made on these problems, a versatile theoretical study, which strictly deals with the size distribution significantly affecting the packing density, has not yet been made. Accordingly, it is supposed that the most important theme is a basic theory for the packing density, which utilizes a size distribution function. Additionally, it is necessary to consider effects, such as particle shapes and interactions among particles, based on the basic theory.

Figure 1:
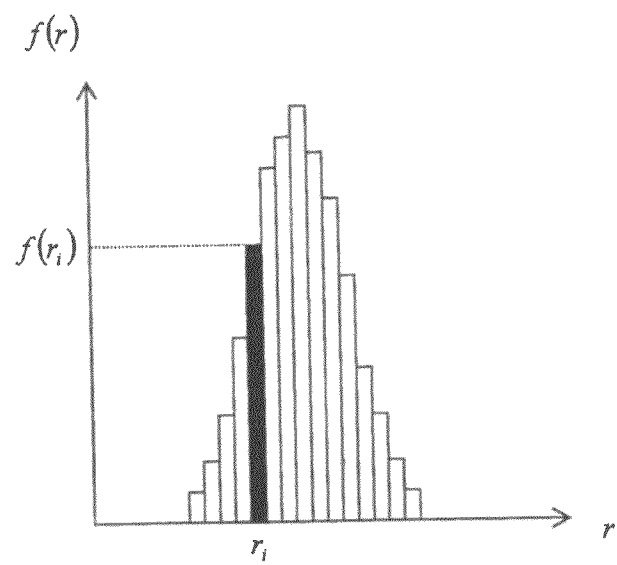
FIG. 1 is a schematic diagram showing an example of the size distribution f(r) of powder.

In order to deal with a particle system having closed packing, it is assumed for simplicity that particles are spherical. The distribution function f(r) of a spherical particle system has been standardized. FIG. 1 schematically shows a size distribution f(r) of powder. In the size distribution f(r) of the powder, the frequency of i-particles having a radius of $r_i$ is $f(r_i)$. It should be noted that a representative size in a certain range of particle sizes is employed as the radius of n.

$$\sum_i f(r_i) = 1 \tag{1}$$

where $r_i$ is the radius of i-particles contained in the powder.

Figure 2:
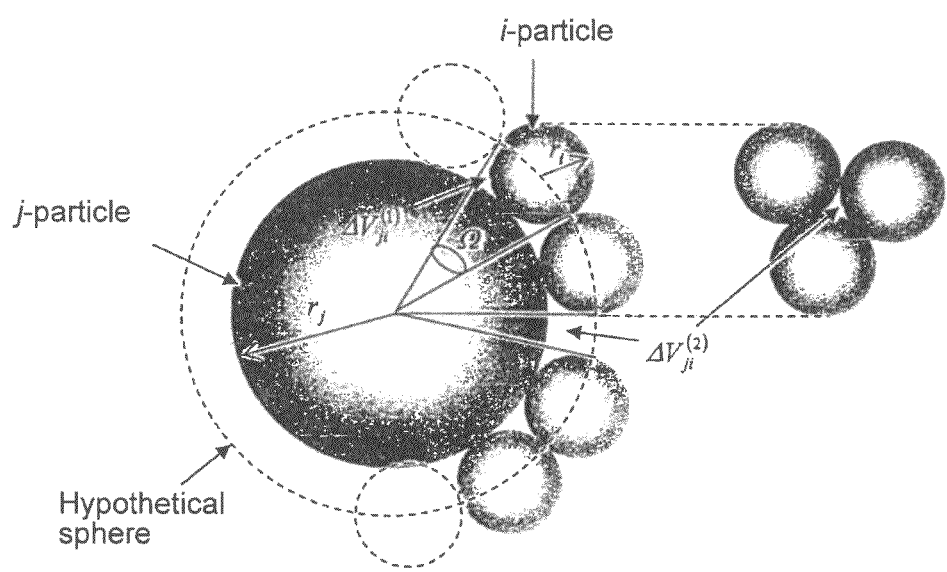
FIG. 2 is a schematic view showing a state where a j-particle (having a radius of $r_j$) forming powder has i-particles (having a radius of $r_i$) closely packed therearound.

In order to analyze the void fraction of a particle system, it is assumed that a j-particle (having a radius of $r_j$) has i-particles (having a radius of n) closely packed therearound (in other words, the j-particle and the i-particles are spherical, and the j-particle has i-particles brought into contact therewith therearound. This state is shown in FIG. 2, where a hypothetical sphere having a radius of $r_j+r_i$ is assumed since the void between a j-particle and each of the i-particles surrounding the j-particle is formed within such a hypothetical sphere having a radius of $r_j+r_i$ about the center of the j-particle. The total amount of the voids surrounded by the surface of the j-particle and the hypothetical sphere is expressed as $\Delta V_{ji}$. $\Delta V_{ji}$ consists of the following two elements. One of the elements is the total amount $\Delta V_{ji}^{(1)}$ of the void portion formed by a lower part of an i-particle (a side facing the j-particle) contained by a solid angle Ω having the center 0 of the j-particle as the apex and in contact with the j-particle (this is applicable to all i-particles in contact with the j-particle). The other element is the total amount $\Delta V_{ji}^{(2)}$ of the void portion surrounded by the surface of the j-particle and the hypothetical sphere in a space (a portion having no i-particle) where the void portion on the j-particle is contained by the solid angle Ω having the center 0 of the j-particle as the apex. Accordingly, the total amount $\Delta V_{ji}$ of the void portions surrounded by the surface of the j-particle and the hypothetical sphere is represented by the following formula (2):

$$\Delta V_{ji} = \Delta V_{ji}^{(1)} + \Delta V_{ji}^{(2)} \tag{2}$$

When i-particles have been coordinated around an j-particle in contact with the j-particle (when i-particles have been coordinated in a number not higher than the number having the densest state), the void fraction $\delta_{ji}$ in the hypothetical sphere is supposed to be expressed as in the following formula (3). $V_m$ is the volume of the hypothetical sphere.

$$\delta_{ji} = \frac{\Delta V_{ji}}{V_m} \tag{3}$$

In the case of a particle system having such a size distribution f(r), the number $n_i$ of the particles having a radius of $r_i$ (i-particles) is found by the following formula (4). The left-hand side of formula (4) is called the occupancy rate of the i-particles.

$$\frac{n_i}{\sum_i n_i} = f(r_i) \quad (4)$$

When a single j-particle having a radius of $r_j$ has i-particles having a radius of $r_i$ most closely packed and surrounding therearound so as to be brought into contact therewith (in other words, when a single j-particle having a radius of $r_j$ has i-particles having a radius of $r_i$ most closely packed therearound so as to be brought into contact therewith), the void fraction $\delta_{ji}$ (min) in the hypothetical sphere may be found by the above-mentioned formula (3). The packing rate $p_{ji}$ (max) in the hypothetical sphere around each j-particle in this case is found by the following formula (5):

$$p_{ji}(\max) = 1 - \delta_{ji}(\min) \quad (5)$$

The ratio of the surface area $S_i$ occupied by the i-particles having a radius of $r_i$ in a particle system is given as $S_i/S$ when the total surface area of all particles in the particle system is S. When this relationship is utilized, the packing rate in the hypothetical spheres around the respective j-particles is found by the following formula (6):

$$p_j = \sum_i \frac{S_i}{S} p_{ji}(\max) \quad (6)$$

When the particles forming a system are spherical, S and $S_i$ are found by the following formulas (see formula (8) with respect to $<r^2>$):

$$S = 4\pi \langle r^2 \rangle$$

$$S_j = 4\pi r_i^2 f(r_i)$$

Since the ratio of the volume $V_j$ occupied by the j-particles in the system is given as $V_j/V$ when the total volume of all particles in the system is V, the average packing rate is found by the following formula (7):

$$p = \sum_j \frac{V_j}{V} p_j \quad (7)$$

When the particles forming a system are spherical, $V_j$ is found by the following formulas:

$$V = \frac{4\pi}{3} \langle r^3 \rangle$$

$$V_j = \frac{4}{3} \pi r_j^3 f(r_j)$$

The packing rate p is expressed as the following formula (8) based on the above-mentioned formula (7).

$$p = \sum_i \sum_j \frac{r_i^2 r_j^3 f(r_i) f(r_j)}{\langle r^2 \rangle \langle r^3 \rangle} p_{ji}(\max) \quad (8)$$

where
$f(r_i)$: a frequency of i-particles having a radius of $r_i$ contained in powder particles,
$f(r_j)$: a frequency of j-particles having a radius of $r_j$ contained in the powder particles,
$r_i$: the radius of the i-particles contained in the powder particles,
$r_j$: the radius of the j-particles contained in the powder particles, $$\langle r^2 \rangle: \sum_i r_i^2 f(r_i)$$

$$\langle r^3 \rangle: \sum_i r_i^3 f(r_i)$$

$p_{ji}(\max)$: a void fraction in the hypothetical sphere having a radius of $r_j + r_i$ around a j-particle having a radius of $r_j$ when the j-particle has i-particles most closely packed therearound so as to be brought into contact therewith.

Accordingly, the void fraction $\delta$ in the system is found by the following formula (9):

$$\delta = 1 - p \quad (9)$$

In order to calculate the above-mentioned formula (8), the value of $\Delta V_{ji}$ of the above-mentioned formula (2) may be found by geometric calculation or numerical calculation based on computer simulation. By employing the above-mentioned formulas (8) and (9), it is possible to calculate the packing rate and the void fraction of a system containing spherical particles having a size distribution f(r).

For this purpose, in accordance with the present invention, the size distribution f(r) of powder is found, and the packing rate p of the powder is found according to the above-mentioned formula (8) based on the found size distribution f(r). The void fraction $\delta$ of the powder is found according to the above-mentioned formula (9).

As the method for finding the size distribution f(r) of the powder, there are observation by a SEM (scanning electron microscope) and a size distribution measurement method employing the diffraction of a laser beam.

With respect to mixed systems of a plurality of powder particles having different size distributions, the finding may be made as follows:

When the mixed powder is formed by mixing at least two kinds of powder particles having different size distributions $f_1(r)$, $f_2(r)$, . . . in volume proportions of $V_1:V_2: \ldots$, the frequency $F(r_i)$ of this mixed system is found by the following formula (10):

$$F(r_i) = \frac{\sum_j \frac{p_j V_j f_j(r_i)}{\sum_k r_k^2 f_j(r_k)}}{\sum_j \frac{p_j V_j}{\sum_k r_k^3 f_j(r_k)}} \quad (10)$$

where
- $p_j$: a packing rate of powder particles having a size distribution $f_j(r)$,
- $V_j$: a volume of the powder particles having the size distribution $f_j(r)$,
- $f_j(r_i)$: a frequency of i-particles having a radius of $r_i$ contained in the powder particles having the size distribution $f_j(r)$,
- $r_k$: a radius of k-particles contained in the powder particles,
- $f_j(r_k)$: a frequency of the k-particles having a radius of $r_k$ contained in the powder particles having the size distribution $f_j(r)$.

$p_j$ is the packing rate of the powder particles having a size distribution $f_j$. The packing rate of a mixed system is calculated by replacing the frequency $f(r_i)$ in the above-mentioned formula (8) with the frequency $F(r_i)$ in the above-mentioned formula (10).

Heretofore, the packing rate has been found by approximating the size distribution of a single kind of raw material by use of a well-known statistical distribution function, such as a normal distribution function, a lognormal distribution function or a Rosin-Rammler distribution function. However, such a technique involves two fundamental problems described below. One of the problems is that an actually measured size distribution can be explained by such a statistical distribution function in limited cases. The other problem is that the calculation of the packing rate by use of such a statistical distribution function is semi-empirical or phenomenalistic and that the theory as the basis of the calculation is not generally versatile since it is necessary to introduce empirical constants in order to actually calculate the packing rate. Further, when the packing rate of powder forming by mixing different raw materials having different particle sizes and different size distributions is found as a further stage, there is no other way but to depend on empirical rules and intuition since any technique or any theory has not be proposed for such calculation.

In accordance with the present invention, it is possible to accurately and simply find the packing rate of powder when the size distribution of a raw material is available. In other words, it is possible to accurately and simply find the packing rate or the void fraction of powder by merely inputting the measured data of a size distribution. Since the theoretical calculation is applied to a size distribution, it is possible to make calculation by replacing a size distribution with a mathematical statistical function instead of measured data. Accordingly, it is possible to make use of the method according to the present invention as a tool for studying the relationship between the parameters of a statistical function and the packing rate of powder.

In order to perform simulation for actual mixed powder, it is necessary to calculate the packing rates of mixed powder particles with the mixing proportions of several kinds of raw material powder particles being changed. However, by merely inputting the data of size distributions of the raw material powder particles so as to correspond to the different mixed powder particles, it is possible to find packing rates obtained when the raw material powder particles are mixed at different mixing proportions. Accordingly, whatever kinds of raw materials are employed, the mixing proportion that maximizes the packing rate can be found by calculation as long as the data of the size distributions of the respective kinds of raw material powder particles are available. Since the packing rate can be theoretically calculated, the mixing operation or the mixing control of raw material powder particles is made strict without depending on a skilled person's experience or intuition as describe above. Thus, it is possible to stably produce cement so as to meet a desired standard.

The present invention is applicable not only to the mixing of raw materials in the cement industry or the ceramic production but also to all other fields, which deal with powder.

EXAMPLE

Example 1

Figure 3:
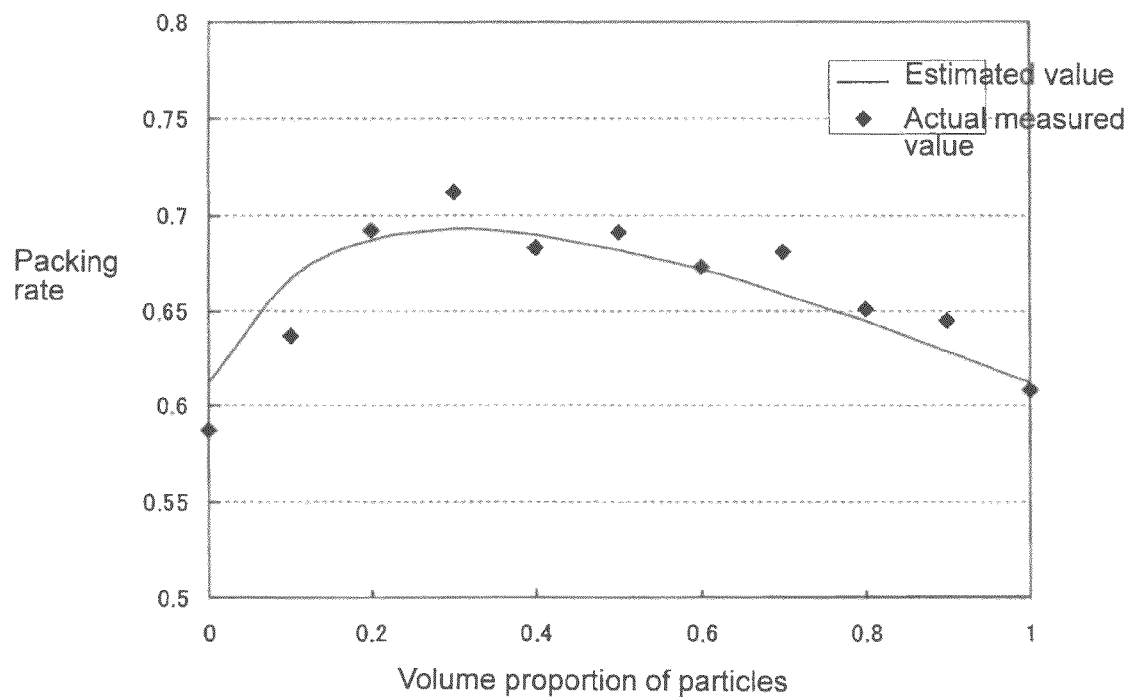
FIG. 3 is a graph showing packing rates found by the method according to the present invention and actually measured packing rates with respect to powder where two kinds of spherical particles having a radius of 1 mm and having a radius of 5 mm were mixed in several kinds of ratios (volume ratios) in Example 1.

With respect to the packing rates of particle systems forming by mixing spherical particles having two different radii of 1 mm and 5 mm, the packing rates were found by the method according to the present invention. The results obtained by comparing the found packing rates with actual measured values are shown in FIG. 3. The horizontal axis of FIG. 3 represents the volume ratio $V_1/V_2$ of the volume $V_1$ occupied by the spherical particles having a radius of 1 mm and the volume $V_2$ occupied by the spherical particles having a radius of 5 mm in such particle systems. In this Example, $\Delta V_{ji}$ in the above-mentioned formula (2) was found by numerical calculation according to computer simulation, and the calculation was performed according to formula (8). With respect to the actual measured values, the respective particle systems were immersed in a liquid, and the volumes of the liquid that were required for immersion were measured to find the void fractions, and the actual measured values were found based on the found void fractions. In this figure, the solid line represents the values found by the method according to the present invention, which clearly reveals that the actual measured values were almost qualitatively and quantitatively estimated by the found values.

Example 2

Figure 4:
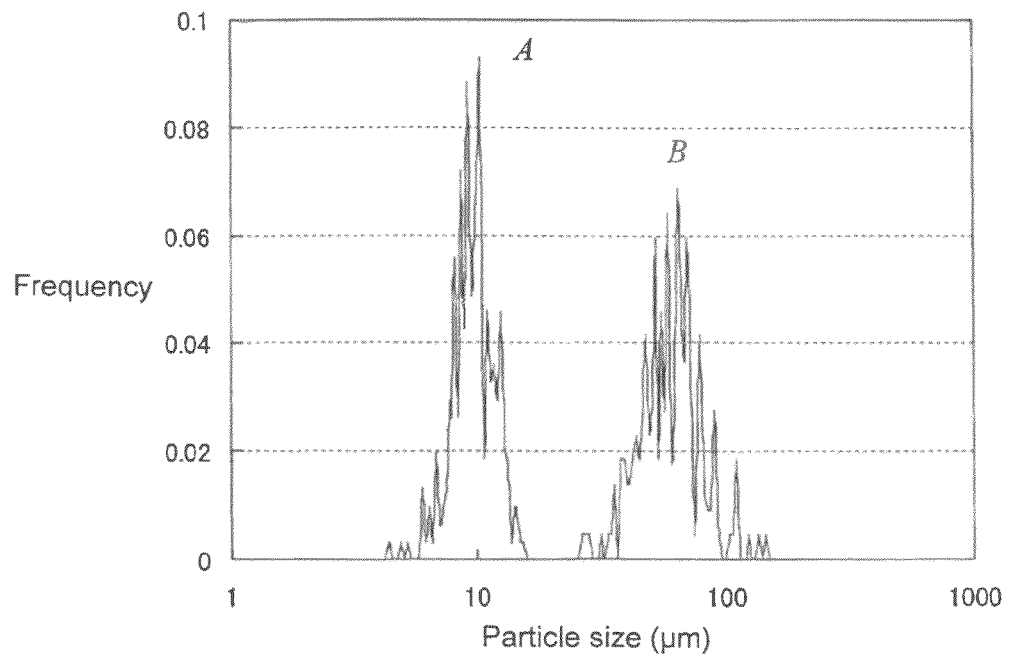
FIG. 4 is a graph showing size distributions of raw materials A and B forming powder, the packing rates of which were found in Example 2.
Figure 5:
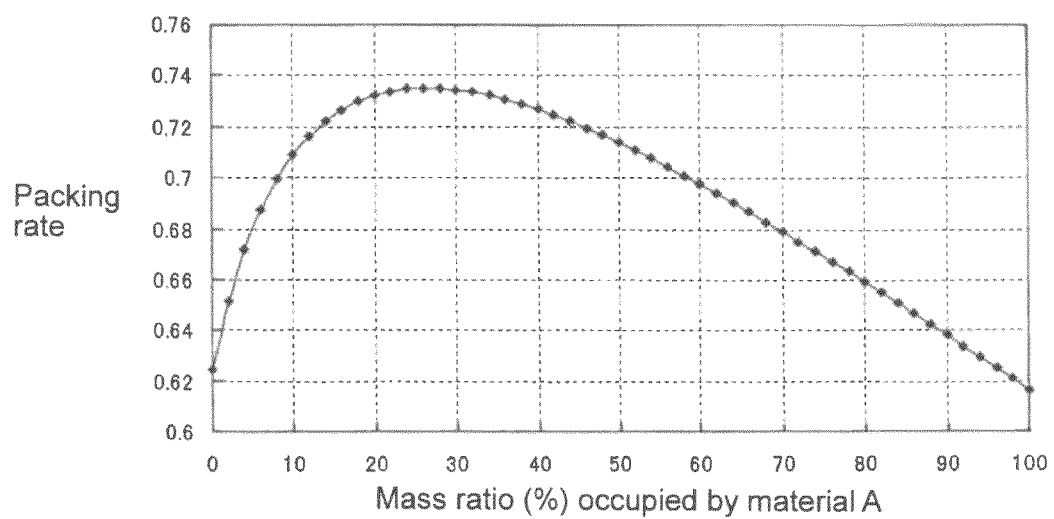
FIG. 5 is a graph showing packing rates found by the method according to the present invention with respect to powder with raw materials A and B mixed in several kinds of ratios in Example 2.

Packing rates of mixed powder particles with two kinds of raw materials A and B having size distributions shown in FIG. 4 were found by using formulae (10) and (8) according to the method of the present invention. The results are shown in FIG. 5. The horizontal axis of FIG. 5 represents the mass ratios of raw material A in the mixed powder particles. In this embodiment as well, $\Delta V_{ji}$ in the above-mentioned formula (2) was found by numerical calculation by use of computer simulation, and the calculation of formula (10) and formula (8) were performed. FIG. 5 reveals that the packing rates of mixed powder particles with raw materials A and B mixed therein had the maximum value at a mixing ratio of A:B=0.74:0.26.

The entire disclosure of Japanese Patent Application No. 2011-152398 filed on Jul. 9, 2011 including specification, claims, drawings and summary is incorporated herein by reference in its entirety.

What is claimed is:

1. A method for finding a packing rate of powder particles, comprising:
   finding a size distribution f(r) of the powder particles, and calculating, on a computer, a packing rate p of the powder particles based on the size distribution f(r) according to the following formula (a)

$$p = \sum_i \sum_j \frac{r_i^2 r_j^3 f(r_i) f(r_j)}{\langle r^2 \rangle \langle r^3 \rangle} p_{ji}(\max) \quad (a)$$

where $f(r_i)$: a frequency of i-particles having a radius of $r_i$ contained in the powder particles, $f(r_j)$: a frequency of j-particles having a radius of $r_j$ contained in the powder particles, $r_i$: the radius of the i-particles contained in the powder particles, $r_j$: the radius of the j-particles contained in the powder particles, $$\langle r^2 \rangle : \sum_i r_i^2 f(r_i)$$

$$\langle r^3 \rangle : \sum_i r_i^3 f(r_i)$$

$p_{ji}(max)$: a void fraction in a hypothetical sphere having a radius of $r_j+r_i$ around a j-particle having a radius of $r_j$ when the j-particle has i-particles most closely packed therearound so as to be brought into contact therewith.

2. A method for finding a packing rate p of a powder mixture of at least two powder particles, comprising:

calculating, on a computer, the packing rate p of the powder mixture according to formula (a) based on a frequency $F(r_i)$ of the mixed powder particles given by the following formula (b), wherein the powder mixture comprises at least two kinds of powder particles having size distributions of $f_1(r), f_2(r), \ldots$ at volume proportions of $V_1:V_2:\ldots$ $$p = \sum_i \sum_j \frac{r_i^2 r_j^3 f(r_i) f(r_j)}{\langle r^2 \rangle \langle r^3 \rangle} p_{ji}(max) \quad (a)$$

where $f(r_i)$: a frequency of i-particles having a radius of $r_i$ contained in the powder particles, $f(r_j)$: a frequency of j-particles having a radius of $r_j$ contained in the powder particles, $r_i$: the radius of the i-particles contained in the powder particles, $r_j$: the radius of the j-particles contained in the powder particles, $$\sum_i r_i^2 f(r_i) \quad \langle r^2 \rangle$$

$$\sum_i r_i^3 f(r_i) \quad \langle r^3 \rangle$$

$p_{ji}(max)$: a void fraction in a hypothetical sphere having a radius of $r_j+r_i$ around a j-particle having a radius of $r_j$ when the j-particle has i-particles most closely packed therearound so as to be brought into contact therewith, $$F(r_i) = \frac{\sum_j \frac{p_j V_j f_j(r_i)}{\sum_k r_k^3 f_j(r_k)}}{\sum_j \frac{p_j V_j}{\sum_k r_k^3 f_j(r_k)}} \quad (b)$$

where $p_j$: a packing rate of powder particles having a size distribution $f_j(r)$, $V_j$: a volume of the powder particles having the size distribution $f_j(r)$, $f_j(r_i)$: a frequency of i-particles having a radius of $r_i$ contained in the powder particles having the size distribution (r), $r_k$: a radius of k-particles contained in the powder particles, $f_j(r_k)$: a frequency of the k-particles having a radius of $r_k$ contained in the powder particles having the size distribution $f_j(r)$.

3. The method of claim 1, further comprising:
calculating, on a computer, a void fraction δ of the powder particles according to the following formula (c) based on the packing rate p of the powder particles:

δ=1−p  (c).

4. The method of claim 2, further comprising:
calculating on a computer, a void fraction δ of the powder particles according to the following formula (c) based on the packing rate p of the powder particles:

δ=1−p  (c).

5. The method for finding the packing rate of the powder particles according to claim 1, wherein the powder particles comprise cement.

6. The method for finding the packing rate of the powder particles according to claim 2, wherein the powder particles comprise cement.

7. The method for finding the packing rate of the powder particles according to claim 3, wherein the powder particles comprise cement.

8. The method according to claim 1, further comprising
mixing a first powder particle comprising particles having a radius $r_i$ and a second powder particle comprising particles having a radius $r_j$ to form a cement, then calculating, on a computer, the packing rate p of the cement according to formula (a).

9. The method of claim 2, further comprising:
mixing a first powder comprising particles having a radius $r_i$ and a second powder comprising particles having a radius $r_j$ to form a cement, then calculating the packing rate p of the cement according to formula (a).

10. The method according to claim 1, wherein the radii of the i-particles and the j-particles does not change during the calculating.

11. The method according to claim 1, wherein the radii $r_i$ and $r_j$ are constant during the calculating.

12. The method according to claim 2, wherein the radii of the i-particles, the j-particles and the k-particles does not change during the calculating.

13. The method according to claim 3, wherein the radii $r_i$, $r_j$ and $r_k$ are constant during the calculating.

* * * * *